United States Patent
Orlinskiy

(10) Patent No.: US 11,691,564 B2
(45) Date of Patent: Jul. 4, 2023

(54) ENVIRONMENT ILLUMINATING DEVICE FOR A MOTOR VEHICLE

(71) Applicant: Bayerische Motoren Werke Aktiengesellschaft, Munich (DE)

(72) Inventor: Victor Orlinskiy, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/790,789

(22) PCT Filed: Mar. 15, 2021

(86) PCT No.: PCT/EP2021/056441
§ 371 (c)(1),
(2) Date: Jul. 5, 2022

(87) PCT Pub. No.: WO2021/190961
PCT Pub. Date: Sep. 30, 2021

(65) Prior Publication Data
US 2023/0043052 A1    Feb. 9, 2023

(30) Foreign Application Priority Data
Mar. 24, 2020  (DE) ...................... 10 2020 108 009.3

(51) Int. Cl.
*B60Q 1/24*       (2006.01)
*F21S 41/60*      (2018.01)
(Continued)

(52) U.S. Cl.
CPC ............ *F21S 41/60* (2018.01); *B60Q 1/0023* (2013.01); *B60Q 1/0029* (2013.01); *B60Q 1/247* (2022.05);
(Continued)

(58) Field of Classification Search
CPC .......................... B60Q 1/247; F21W 2103/60
See application file for complete search history.

(56) References Cited

U.S. PATENT DOCUMENTS 10,703,284 B2    7/2020  Schnellbach
11,117,510 B2 *  9/2021  Weber .................. B60Q 1/0041
(Continued)

FOREIGN PATENT DOCUMENTS

DE    10 2004 050 600 A1    4/2006
DE    10 2015 220 911 A1    4/2017
(Continued)

OTHER PUBLICATIONS

Machine Translation for DE2004050600A1 (Year: 2004).*
(Continued)

*Primary Examiner* — Robert J May
(74) *Attorney, Agent, or Firm* — Crowell & Moring LLP

(57) ABSTRACT

A motor vehicle includes an environment illuminating device for emitting light toward the ground in the environment of the motor vehicle. The environment illuminating device includes one or more luminous modules, each of which is configured to generate a light distribution on the ground. A respective luminous module includes an image generator configured to generate light radiation from light from an illuminant, the light radiation containing two-dimensional image information concerning, firstly, a symbol representation and, secondly, a light pattern and/or a homogeneous area with a substantially constant luminance. Furthermore, the respective luminous module includes an optical device, on which the light radiation from the image generator is incident.

16 Claims, 2 Drawing Sheets

(51) Int. Cl.
  *B60Q 1/00*    (2006.01)
  *F21W 103/60*  (2018.01)
(52) U.S. Cl.
  CPC ..... *B60Q 2400/50* (2013.01); *F21W 2103/60* (2018.01)

(56) References Cited

U.S. PATENT DOCUMENTS

| | | | | |
|---|---|---|---|---|
| 11,167,689 | B2* | 11/2021 | Miao | ............ B60Q 1/247 |
| 2017/0210282 | A1 | 7/2017 | Rodriguez Barros | |
| 2018/0236929 | A1 | 8/2018 | Goeke et al. | |
| 2018/0361915 | A1 | 12/2018 | Kuhl et al. | |
| 2019/0106050 | A1 | 4/2019 | Kamhi et al. | |
| 2019/0270403 | A1 | 9/2019 | Sobecki et al. | |
| 2019/0322209 | A1 | 10/2019 | Sugiyama et al. | |
| 2020/0290516 | A1* | 9/2020 | Messenger | ............ B60Q 1/247 |

FOREIGN PATENT DOCUMENTS

| | | |
|---|---|---|
| DE | 10 2016 202 752 A1 | 8/2017 |
| DE | 10 2017 115 974 A1 | 1/2019 |
| DE | 10 2018 102 175 A1 | 8/2019 |
| DE | 11 2017 006 014 T5 | 9/2019 |
| DE | 10 2018 206 040 A1 | 10/2019 |
| EP | 2 072 336 A1 | 6/2009 |
| KR | 10-2018-0041103 A1 | 4/2018 |
| WO | WO 2017/144247 A1 | 8/2017 |

OTHER PUBLICATIONS

International Search Report (PCT/ISA/210) issued in PCT Application No. PCT/EP2021/056441 dated Jun. 7, 2021 with English translation (six (6) pages).

German-language Written Opinion (PCT/ISA/237) issued in PCT Application No. PCT/EP2021/056441 dated Jun. 7, 2021 (seven (7) pages).

German-language Search Report issued in German Application No. 10 2020 108 009.3 dated Dec. 10, 2020 with partial English translation (10 pages).

* cited by examiner

ENVIRONMENT ILLUMINATING DEVICE FOR A MOTOR VEHICLE

BACKGROUND AND SUMMARY OF THE INVENTION

The invention relates to a motor vehicle having an environment illuminating device for emitting light toward the ground in the environment of the motor vehicle.

Generating different light distributions on the ground in the environment of a motor vehicle using an environment illuminating device is known from the prior art.

Document DE 10 2015 220 911 A1 describes a motor vehicle having an environment illuminating device which comprises an array made up of projection optical units to generate a light pattern or a homogeneous light distribution possibly in combination with a symbol on the ground in the environment of the motor vehicle.

It is not taken into consideration in known environment illuminating devices that the requirements for generating a symbol are different from the requirements for generating a light pattern or a homogeneous light distribution. The readability is in the foreground in the generation of a symbol, whereas a planar illumination of the corresponding ground region is relevant in the generation of a light pattern or a homogeneous light distribution.

The object of the invention is to provide a motor vehicle having an environment illuminating device using which a symbol and a light pattern or a homogeneous surface are generated decoupled from one another on the ground in the environment of the motor vehicle.

This object is achieved by the claimed invention.

The motor vehicle according to an embodiment of the invention comprises an environment illuminating device for emitting light toward the ground in the environment of the motor vehicle. For this purpose, the environment illuminating device comprises one or more light modules, which are each configured to generate a light distribution on the ground.

A respective light module in turn comprises an imager, which is configured to generate a light radiation from light of a lighting device, which is part of the respective light module, which light radiation contains an item of two-dimensional image information for a symbol, on the one hand, and a light pattern and/or a homogeneous surface having essentially constant luminance, on the other hand. A symbol is to be understood as a representation having a semantic meaning content for an observer. In particular, a symbol contains one or more graphic and/or textual elements, e.g., a logo and/or lettering. The respective light module furthermore contains an optical device on which the light radiation of the imager is incident. This optical device is configured to divide the light radiation of the imager so that a first partial radiation and a second partial radiation result, which are disjoint from one another, i.e., which do not overlap. The light radiation can possibly also be divided into still further partial radiations.

The optical device of the respective light module is furthermore configured to generate a first illumination region comprising the symbol in the light distribution on the ground from the first partial radiation and to generate a second illumination region comprising the light pattern and/or the homogeneous surface in the light distribution on the ground from the second partial radiation. In one variant, the first and the second illumination region are disjoint, i.e., they do not overlap.

The motor vehicle according to an embodiment of the invention is distinguished in that the light radiation of an imager is divided by way of an optical device in such a way that a part of the light radiation is only used to generate a symbol and another part of the light radiation is only used to generate a light pattern or a homogeneous surface. The optical device thus enables a separate handling of the light radiation generated by the imager in dependence on whether a symbol or a light pattern or a homogeneous surface is represented. In this way, different requirements in the generation of a symbol or a light pattern or a homogeneous surface can be taken into consideration in a simple manner.

In one particularly preferred embodiment, the area of the second illumination region is greater than the area of the first illumination region. This takes into consideration the fact that a light pattern or a homogeneous light distribution is usually represented on a large area, whereas a symbol is only to be represented in a small area.

In a further preferred embodiment, the area focal point of the first illumination region is closer to a light outlet opening of the respective light module on the outside of the motor vehicle than the area focal point of the second illumination area. The light of the light module leaves the motor vehicle on its outside via the light outlet opening. According to this variant of the invention, it is taken into consideration that it is easier to generate a well-readable symbol the closer the symbol is to the light module.

In a further preferred embodiment, the first illumination region has a higher average luminance than the second illumination region. The concept of the average luminance relates to the mean value of the luminance over the area of the respective illumination region.

Depending on the design, the imager in the respective light module of the motor vehicle according to the invention can be designed differently. It is preferably a digital imager, which is configured to generate the light radiation based on digital image data. In this way, different light distributions can be generated flexibly using the imager. Nonetheless, the imager can possibly also be an analog imager having an item of fixed image information (for example, a slide).

In one preferred variant of the above-described embodiment, the digital imager is designed in such a way that the digital image data for the first illumination region and the digital image data for the second illumination region can be read out independently of one another from a storage medium by the digital imager, due to which the first illumination region and the second illumination region can be generated independently of one another. This embodiment can be combined in particular with the further variant described below, in which the first illumination region and/or the second illumination region is animated. For example, different resolutions and frame rates can be used for the two illumination regions to save storage space. For example, the animation for the symbol in the first illumination region can be rather short, but high resolution in return, whereas the animation in the second illumination region is longer, but has a lower frame rate and lower resolution.

In a further particularly preferred embodiment, the digital imager contains an imaging surface. The digital imager preferably comprises an LCD display (LCD=liquid crystal display) and/or an LED display (LED=light-emitting diode) and/or an OLED display (OLED=organic light-emitting diode) and/or a DMD imager (DMD=digital mirror device). All of these digital imagers are known to a person skilled in the art and are therefore not described further in detail. A DMD imager contains a DMD device in the form of an array made up of a plurality of micromirrors which are moved via an actuator to deflect light radiation in different directions and generate an item of image information in this way.

In a further preferred embodiment, the digital imager is a scanning imager which is configured to generate the light radiation using a moving light beam. Such an imager contains a scanner, using which the moving light beam is generated. In one variant, the scanner directs the light beam directly toward the optical device of the corresponding light module, without an imaging surface being provided. Nonetheless, it is also possible that the scanner first casts the light beam on an imaging surface, wherein the light radiation reaches the optical device from the imaging surface.

Depending on the variant, the lighting device of a respective light module can be designed differently. The lighting device preferably comprises an LED light source made up of one or more LEDs and/or a laser light source made up of one or more laser diodes.

In one preferred embodiment, the optical device for dividing the light radiation comprises a beam deflector, wherein the beam deflector preferably contains one or more mirrors and/or one or more prisms. Such a beam deflector enables the division of the light radiation into disjoint partial radiations in a simple manner.

In a further preferred embodiment, the optical device comprises a first projection optical unit for the first partial radiation to generate the first illumination region by way of a projection on the ground. This first projection optical unit is preferably designed in such a way that the symbol is imaged sharply and/or equalized on the ground. To generate an equalized representation, the projection optical unit can carry out, for example, a keystone correction known per se.

In a further preferred variant, the optical device comprises a second projection optical unit for the second partial radiation to generate the second illumination region by way of a projection on the ground. The second projection optical unit is thus adapted to generating the light pattern or the homogeneous light distribution. If the optical device also contains a first projection optical unit, the second projection optical unit is a different projection optical unit than the first projection optical unit. For example, the second projection optical unit can effectuate a suitable expansion of the second partial radiation to illuminate a larger surface region.

In a further preferred embodiment, a respective light module is designed in such a way that the first illumination region and/or the second illumination region is animated, i.e., the corresponding symbol or the light pattern and/or the homogeneous surface are dynamically changed during the reproduction.

In a further preferred design, at least one light module is installed in the motor vehicle according to the invention on a lateral motor vehicle side which extends between the front and rear of the motor vehicle, to generate a light distribution adjacent to the lateral motor vehicle side in operation. For example, the light module is installed in the door sill of a driver door or front passenger door and possibly also in the door sill of a rear door. In this way, appealing light scenarios can be generated, for example, upon the approach of a driver to the driver door, using the environment illuminating device. Alternatively or additionally, it is also possible that the at least one light module is installed on the front of the motor vehicle to generate a light distribution in front of the motor vehicle in operation, and/or that at least one light module is installed on the rear of the motor vehicle, to generate a light distribution behind the motor vehicle in operation.

An exemplary embodiment of the invention is described in detail hereinafter on the basis of the appended figures.

DETAILED DESCRIPTION OF THE DRAWINGS

Figure 1:
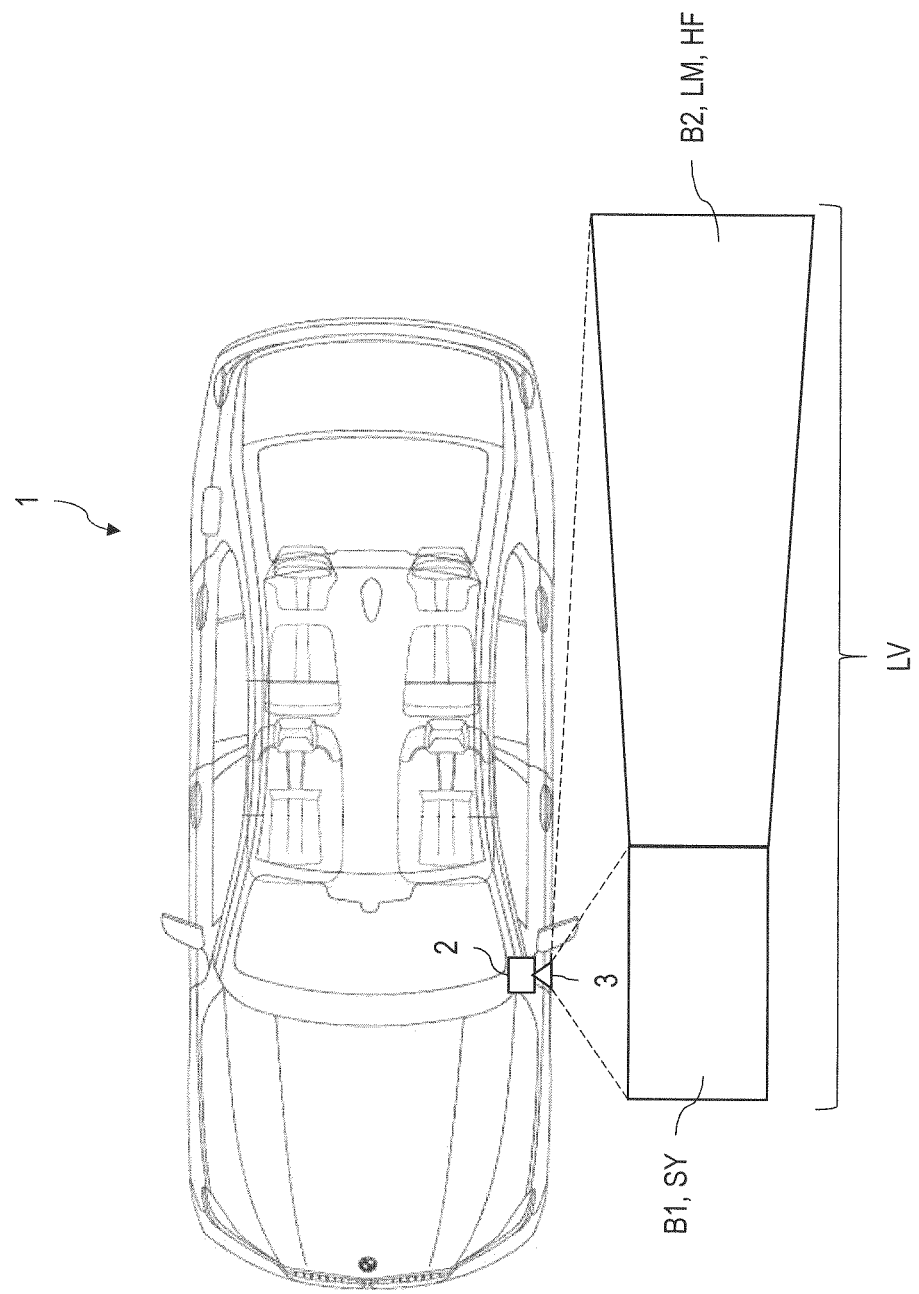
FIG. 1 shows a schematic top view from above of an embodiment of a motor vehicle according to the invention which generates a light distribution using a light module.

An embodiment of the invention is described hereinafter on the basis of the motor vehicle of FIG. 1, which is identified by the reference sign 1. This motor vehicle comprises an environment illuminating device having a light module 2, which is installed in the door sill of the driver door approximately at the height of the side mirror. The light generated by the light module 2 exits from the door sill via a light outlet opening 3 and is incident on the ground adjacent to the left side of the motor vehicle. The light generates a light distribution LV there, which is composed of a first illumination region B1 and a second illumination region B2.

A further light module, which has the same structure as the light module 2, is furthermore also installed on the front passenger side of the motor vehicle 1 approximately at the height of the front passenger mirror in the door sill and generates the same light distribution on the right vehicle side as on the left vehicle side. For reasons of clarity, however, only the light module 2 on the left vehicle side is shown.

The light module 2 is distinguished in that it generates two different illumination regions on the ground. A symbol SY is reproduced sharply in the illumination region B1. As already mentioned above, the symbol is an illustration which has a meaning content for the observer, for example, a logo or lettering. In contrast, a light pattern LM, for example, in the form of a stripe pattern, is reproduced in the illumination region B2, which adjoins the illumination region B1 to the rear in the vehicle longitudinal direction. Alternatively or additionally, the illumination region B2 can contain a homogeneously illuminated surface HF. The two illumination regions B1 and B2 are generated based on a projection.

To generate the two illumination regions B1 and B2, light radiation is divided in the light module 2 into two partial radiations, which are each projected by different projection optical units toward the ground. This is described below in detail on the basis of FIG. 2. The one projection optical unit ensures that the symbol SY is reproduced sharply and preferably also equalized in the illumination region B1, whereas the other projection optical unit ensures a large-area reproduction of a light pattern or a homogeneous light distribution having constant luminance in the illumination region B2.

To simplify the sharp reproduction of the symbol, the illumination region B1 is arranged closer to the light outlet opening 3 of the light module 2 than the illumination region B2. In contrast to the illumination region B1, the illumination region B2 is not subject to the requirement that a symbol has to be shown sharply. Rather, a planar light distribution has to be generated in the illumination region B2. The illumination region B2 has a significantly larger area extension than the illumination region B1. In addition, the luminance averaged over the area of the respective illumination region is lower for the illumination region B2 than for the illumination region B1.

Figure 2:
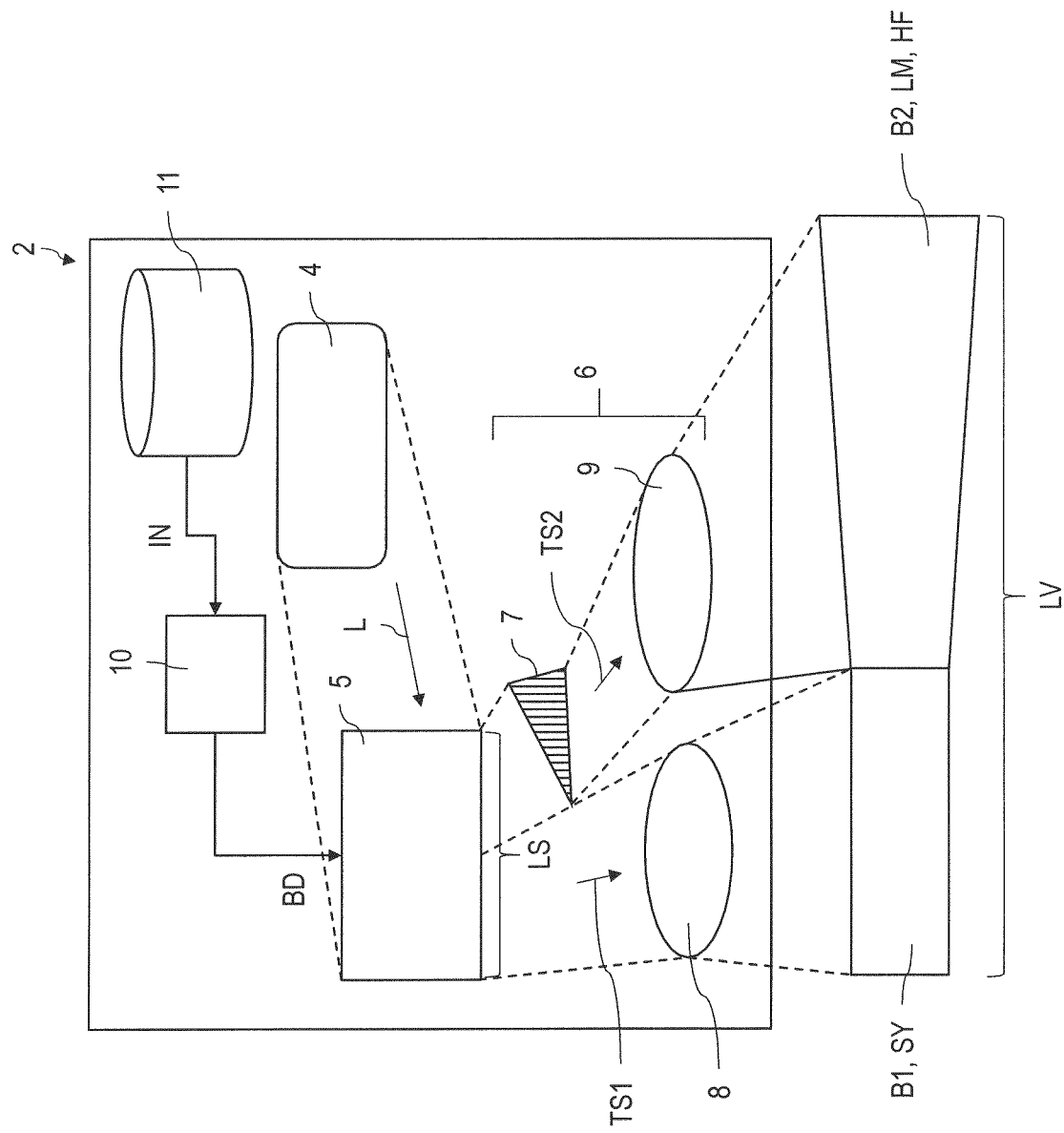
FIG. 2 shows a schematic illustration of the light module which is installed in the motor vehicle of FIG. 1.

FIG. 2 shows a schematic illustration of the light module 2 from FIG. 1. The light module comprises a digital imager, which contains a light source 4 and an imaging surface 5.

The light L generated by the light source is incident on the imaging surface 5. In the embodiment described here, the imager is a DMD imager, in which the imaging surface is a DMD device made up of a plurality of tiltable micromirrors. By corresponding activation of the micromirrors using an actuator, an image having a brightness distribution can be generated on the micromirror array from the light of the light source 4. For this purpose, the DMD device 5 receives digital image data BD, which are provided by a microprocessor 10, which reads out items of digital information IN from a memory 11.

The items of information IN describe one or more images to be generated on the DMD device and are provided by the microprocessor 10 as image data BD in a format which is processable by the DMD device 5. Based on the image data BD, the DMD device generates a light radiation LS, which corresponds to respective images which contain a symbol and a light pattern and/or a homogeneous surface. In one variant of the invention, image data in the form of a video stream made up of changing images are supplied to the DMD device 5, so that the image contents of the illumination regions B1 and B2 vary over time and reproduce animated images.

Instead of a DMD imager, any other imager can also be used according to an embodiment of the invention. It is only decisive that the imager generates an item of two-dimensional image information via a symbol or via a light pattern and/or a homogeneous surface. For example, the imager can also be an LCD display or an OLED display. The imager can also be a scanning imager, in which a corresponding item of image information is generated via a scanning movement of a light beam.

In a scanning imager, the DMD device or the imaging surface 5 can be replaced by a corresponding scanning mirror, which deflects a light beam (for example a laser beam) of the light source 4 and its scanning movement describes the two-dimensional image information. It is also possible that the light beam deflected by the scanning mirror is directed onto a surface on which the corresponding image content then results due to the scanning movement of the light beam. For example, the surface can be a conversion layer, which converts a monochromatic light beam into white light. The scanning mirror of the scanning imager can be manufactured, for example, as a MEMS component (MEMS=micro-electromechanical system). The DMD device is preferably also a MEMS component.

The light radiation LS which is generated by the DMD device 5 is incident in the light module 2 on an optical device 6. The optical device causes, inter alia, a division of this light beam into a first partial radiation TS1 and a second partial radiation TS2. This division is effectuated in the embodiment of FIG. 1 by a prism 7, which suitably deflects a part of the light radiation LS, so that the two disjoint partial radiations TS1 and TS2, which are spatially separate from one another, result. The partial radiation TS1 contains the image information for the symbol and the partial radiation TS2 contains the image information for the light pattern and/or for the homogeneous surface.

The two separated partial radiations TS1 and TS2 are incident on separate projection optical units 8 and 9, respectively, which are each designed differently and each contain one or more lenses. The symbol SY is imaged sharply in the first illumination region B1 using the projection optical unit 8. In contrast, the projection optical unit 9 has the task of generating the large-area second illumination region B2 from the partial radiation TS2, which contains the light pattern LM or the homogeneously illuminated surface HF.

The embodiment of the invention described above has an array of advantages. In particular, an environment illuminating device having one or more light modules is provided, which each generate both a symbol and also a large-area illuminated region in the environment of the motor vehicle. To take into consideration the different requirements for displaying a symbol and a large-area illuminated region, light radiation is divided in such a way that the light which is responsible for generating the symbol is separated from the light which is used for generating the large-area illuminated region.

The division of the light radiation enables the use of two different projection optical units. The projection optical unit, using which the symbol is generated, ensures the sharp reproduction of this symbol on the ground. In contrast, the projection optical unit which is responsible for generating the large-area illuminated region generates a light projection using which a homogeneous illumination or a suitable representation of a light pattern in a large surface region is achieved, without this representation having to be sharp on its entire area.

LIST OF REFERENCE SIGNS 1 motor vehicle
2 light module
3 light outlet opening
B1 first illumination region
SY symbol
B2 second illumination region
LM light pattern
HF homogeneous surface
4 lighting device
5 imaging surface
6 optical device
7 prism
8, 9 projection optical units
10 microprocessor
11 memory
BD image data
IN items of digital information
L light
LS light radiation
TS1, TS2 partial radiation

The invention claimed is:
1. A motor vehicle comprising:
an environment illuminating device for emitting light toward ground in an environment of the motor vehicle, wherein:
the environment illuminating device comprises one or more light modules, which are each configured to generate a light distribution on the ground;
a respective light module comprises an imager, which is configured to generate a light radiation from light of a lighting device, which contains an item of two-dimensional image information for a symbol, and a light pattern and/or a homogeneous surface having essentially constant luminance;
the respective light module further comprises an optical device, on which the light radiation of the imager is incident;
the optical device is configured to divide the light radiation of the imager so that a first partial radiation and a second partial radiation result, wherein the first partial radiation and the second partial radiation are disjoint from one another;

the optical device is further configured to generate a first illumination region comprising the symbol in the light distribution on the ground from the first partial radiation and to generate a second illumination region comprising at least one of the light pattern or the homogeneous surface in the light distribution on the ground from the second partial radiation, and the optical device comprises a first projection optical unit on which only the first partial radiation is incident, to generate the first illumination region by way of a projection on the ground.

2. The motor vehicle according to claim 1, wherein an area of the second illumination region is greater than an area of the first illumination region.

3. The motor vehicle according to claim 1, wherein an area focal point of the first illumination region is closer to a light outlet opening of the respective light module on an outside of the motor vehicle than an area focal point of the second illumination region.

4. The motor vehicle according to claim 1, wherein the first illumination region has a higher average luminance than the second illumination region.

5. The motor vehicle according to claim 1, wherein the imager is a digital imager, which is configured to generate the light radiation based on digital image data.

6. The motor vehicle according to claim 5, wherein the digital imager is configured such that the digital image data for the first illumination region and the digital image data for the second illumination region are readable independently of one another from a storage medium by the digital imager, due to which the first illumination region and the second illumination region are generatable independently of one another.

7. The motor vehicle according to claim 5, wherein the digital imager contains an imaging surface.

8. The motor vehicle according to claim 7,
wherein the digital imager comprises an at least one of an LCD display, an LED display, an OLED display, or a DMD imager.

9. The motor vehicle according to claim 5, wherein the digital imager is a scanning imager, which is configured to generate the light radiation using a moving light beam.

10. The motor vehicle according to claim 1, wherein the lighting device comprises at least one of an LED-light source made up of one or more LEDs or a laser light source made up of one or more laser diodes.

11. The motor vehicle according to claim 1, wherein the optical device comprises a beam deflector for dividing the light radiation.

12. The motor vehicle according to claim 11, wherein the beam deflector contains at least one of one or more mirrors or one or more prisms.

13. The motor vehicle according to claim 1, wherein the first projection optical unit is configured such that the symbol is at least one of imaged sharply or equalized on the ground.

14. The motor vehicle according to claim 1, wherein the optical device comprises a second projection optical unit on which only the second partial radiation is incident, to generate the second illumination region by way of a projection on the ground.

15. The motor vehicle according to claim 1, wherein a respective light module is configured such that at least one of the first illumination region or the second illumination region is animated.

16. The motor vehicle according to claim 1, wherein at least one of:
at least one light module is installed on a lateral motor vehicle side, which extends between a front and a rear of the motor vehicle, to generate a light distribution adjacent to the lateral motor vehicle side in operation,
at least one light module is installed on the front of the motor vehicle to generate a light distribution in front of the motor vehicle in operation, or
at least one light module is installed on the rear of the motor vehicle to generate a light distribution behind the motor vehicle in operation.

* * * * *